(12) United States Patent
Donatiello et al.

(10) Patent No.: US 8,464,012 B2
(45) Date of Patent: Jun. 11, 2013

(54) METHOD FOR CONTROLLING ACCESS TO A DATA FILE OF AN IC CARD

(75) Inventors: Saverio Donatiello, Mercogliano (IT); Giovanni Fontana, Naples (IT); Corrado Guidobaldi, Naples (IT)

(73) Assignee: Incard S.A., Geneva (CH)

( * ) Notice: Subject to any disclaimer, the term of this patent is extended or adjusted under 35 U.S.C. 154(b) by 382 days.

(21) Appl. No.: 12/832,514

(22) Filed: Jul. 8, 2010

(65) Prior Publication Data

US 2011/0010516 A1 Jan. 13, 2011

(30) Foreign Application Priority Data

Jul. 9, 2009 (IT) .............................. MI2009A1224

(51) Int. Cl.
*G06F 12/14* (2006.01)

(52) U.S. Cl.
USPC ............................ 711/163; 711/115; 711/164

(58) Field of Classification Search
None
See application file for complete search history.

(56) References Cited

U.S. PATENT DOCUMENTS

| | | | | |
|---|---|---|---|---|
| 5,754,262 A | * | 5/1998 | Lengyel | 349/104 |
| 6,003,134 A | * | 12/1999 | Kuo et al. | 726/20 |
| 2006/0107049 A1 | | 5/2006 | Guthery | 713/168 |
| 2008/0237333 A1 | * | 10/2008 | Fukuda et al. | 235/375 |
| 2010/0235905 A1 | * | 9/2010 | Guthery | 726/19 |

OTHER PUBLICATIONS

"Smart Card Handbook, Access to Resources in Accordance with ISO/IEC 7816-9" Jan. 2003, pp. 280-288, Jan. 1, 2003.
Slater et al., "Automated Deduction on a Smart Card", 1998, pp. 239-247.
"Stack-oriented programming language," Mar. 31, 2009, Retrieved from Internet: URL:http//en.wikipedia.org/w/index.php?title=Stack-oriented_programming_language&oldid=280881044.

* cited by examiner

*Primary Examiner* — Than Nguyen
(74) *Attorney, Agent, or Firm* — Allen, Dyer, Doppelt, Milbrath & Gilchrist, P.A.

(57) ABSTRACT

A method is for controlling access to a data file of an IC card and may include storing a plurality of access conditions to be evaluated for accessing the data file, and enabling access to the file if the access conditions are satisfied. The method may further include ordering the access conditions to be evaluated in a Reverse Polish Notation inside a memory queue of the IC card, and evaluating the access conditions starting from a head of the memory queue.

22 Claims, 3 Drawing Sheets

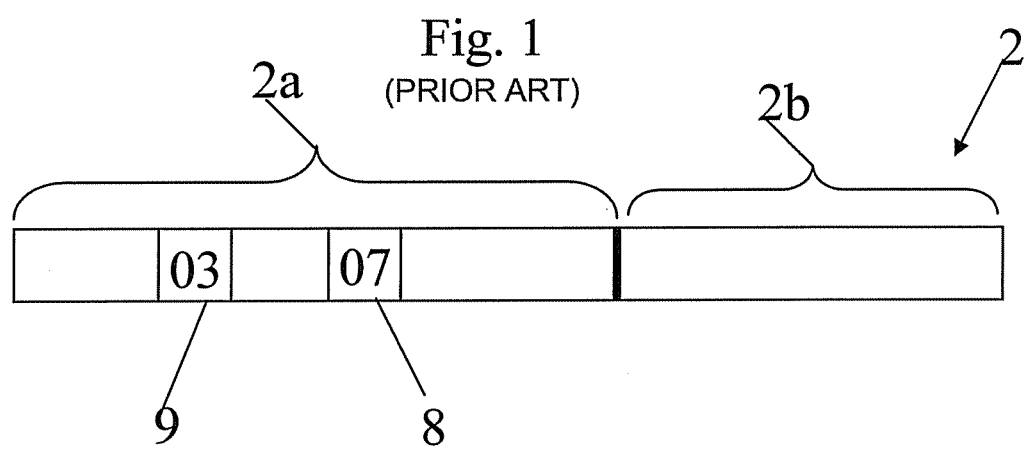
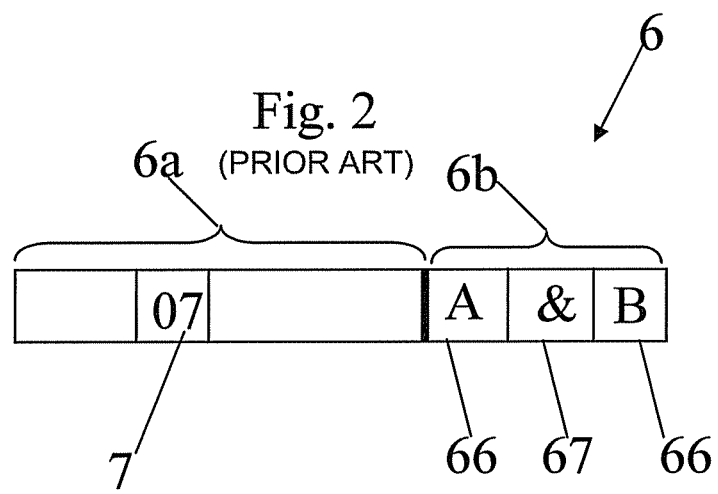

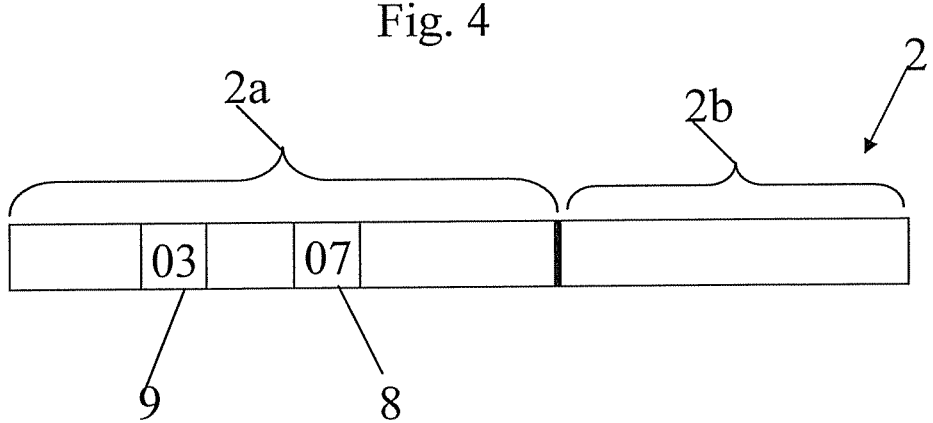
Fig. 4
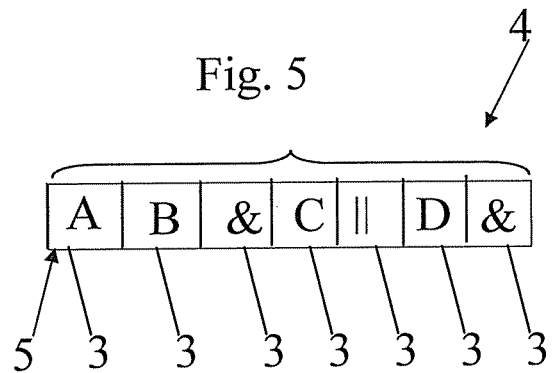
Fig. 5
Fig. 6
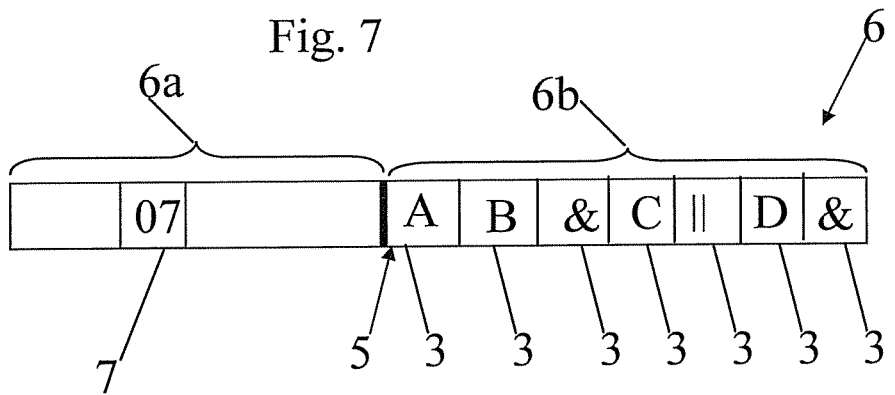
Fig. 7

METHOD FOR CONTROLLING ACCESS TO A DATA FILE OF AN IC CARD

FIELD OF THE INVENTION

The present disclosure relates to a method for controlling access to a data file of an integrated circuit (IC) card including storing a plurality of access conditions to be evaluated for accessing the data file and enabling the access to the file if the access conditions are satisfied, and a related IC card.

BACKGROUND OF THE INVENTION

A method controls access to a data file of an IC card and includes storing a plurality of access conditions to be evaluated for accessing the data file and evaluating the access condition for enabling or denying access to the data file. The access is enabled if the access conditions are satisfied or otherwise it is denied.

With reference to FIG. 1, a data file 2 to be accessed includes a body portion 2b which stores data and a header portion 2a including a field 9 storing a file identifier 03 of the data file 2. The access conditions are stored in a logic file 6, which is schematically represented in FIG. 2, including a respective header portion 6a having a first field 7, which stores a file identifier 07 of the logical file 6 and a body portion 6b comprising the access conditions 66, 67 to be evaluated.

As it is schematically represented in FIG. 1, another field 8 of the header portion 2a of the data file 2 stores the file identifier 7 of the logic file 6 in order to retrieve the corresponding access conditions 66, 67 when an access to the data file 2 is requested, for example, by an IC card program or file.

According to this method, the evaluation of the access conditions is executed by reading the file identifier 03 of the data file 2, reading from the header portion 2a of such data file 2 the file identifier 07 of the logic file 6 and the corresponding access conditions 66, 67, and evaluating the access conditions. More particularly, the access conditions of the logic file 6 are in the form of Boolean operands A, B and a Boolean operator & and the step of evaluating the access conditions "A & B" substantially provides to apply the Boolean operator & to the Boolean operands A, B and to calculate a resulting value which enable or deny access. For example, the method may allow access to the data file 2 if the result of the evaluation "A & B" corresponds to the value 1, i.e. both A=1 and B=1. The data file 2 may be associated to a plurality of access conditions, for example, the access conditions "((A & B)||C) & D" schematically represented in FIG. 3.

The parenthesis "(" and ")" specify the order or precedence in which the access conditions may be evaluated, i.e. initially the access conditions "A & B" may be evaluated, resulting in a corresponding Boolean operand or value X. The result X may be evaluated with C and operator ||, i.e. "X||C," and the corresponding resulting Boolean operand Y may be evaluated with & operator and D, i.e. "Y & D."

With reference to the example given above, in order to specify the precedence of the access conditions to be evaluated, the method provides to store the access condition "A & B" to be evaluated firstly, in a first logic file 60a which is schematically represented in FIG. 3a, having file identifier 05 and body portion 6b storing the access condition "A & B." Since the result of the evaluation of the access condition "A & B" may be evaluated with C and operator ||, the method may further provide to store in the body portion 6b of a second logic file 60b, schematically represented in FIG. 3b, the file identifier 05 wherefrom it may retrieve the result X of the evaluation of the access condition "A & B" and the access conditions to be evaluated with such result X, i.e. C and operator ||. The header portion 6a of the second logic file 60b comprises the corresponding file identifier 06.

Substantially as described above, the method further stores in the body portion 6b of a third logic file 60c, schematically represented in FIG. 3c, the file identifier 06 wherefrom it may retrieve the result Y of the evaluation of the access condition "05||C" and the access condition to be evaluated with such result, i.e. D and operator &. The header portion 6a of the third logic file 60c comprises the corresponding file identifier 07.

Thus, the evaluation of the access conditions associated to the data file of FIG. 1, i.e. the evaluation of "((A & B)||C) & D", may be executed by only reading all the logic files 60a-60c thereto associated, i.e. reading the file identifier 03 of the data file 2 and reading from the header portion 2a of such data file 2 the file identifier 07 of the third logic file 60c and the corresponding access conditions ("06 & D"). Before executing the step of evaluating, since an access condition 06 of the third file 60c corresponds to the file identifier 06 of the second logic file 60b, the access conditions ("05||C") of such second logic file 60b are read. Moreover, since an access condition 05 of the second file 60b corresponds to another file identifier 05 of the first logic file 60a, the access conditions ("A||B") of such first logic file 60a are read.

Only at this stage, the method for controlling access includes evaluating the access condition "A & B", calculating the corresponding result X, returning back to the evaluation of access conditions "X||C" and to the evaluation of access conditions "Y & D".

SUMMARY OF THE INVENTION

The problem at the base of the present disclosure may be to reduce the number of logic files involved in the storage of access conditions associated to a data file and, at the same time, providing a simple and easy way to specify an order in which the access conditions may be evaluated, thus reducing the memory space used to store them and the time involved for their evaluation. This may overcome the problems that currently affect the prior art methods for evaluating access conditions to the data file in the IC card.

The approach of the present disclosure is to store the access conditions to be evaluated for accessing a data file in a single memory queue wherein the access conditions are ordered in a Reverse Polish Notation. According to this approach, a method for controlling access to a data file of an IC card may include storing a plurality of access conditions to be evaluated for accessing the data file, enabling the access to the file if the access conditions are satisfied, ordering the access conditions to be evaluated in a Reverse Polish Notation inside a memory queue of the IC card, and evaluating the access conditions starting from a head of the memory queue.

Another aspect is directed to an IC card storing a data file to be accessed and a plurality of access conditions to be evaluated for accessing the data file and means or a module for enabling the access to the file if the access conditions are satisfied. The access conditions to be evaluated may be ordered in Reverse Polish Notation inside a memory queue of the IC card and the module is programmed to evaluate the access conditions from a head of the memory queue.

Advantageously, the access conditions are evaluated in the order in which they are stored in queue memory and are read from only the single memory queue. Advantageously, the memory space involved in storing the access conditions may be reduced, since only one memory queue associated to the data file is used, and also the time for evaluating the access conditions may be reduced, since only one memory queue is identified and accessed for retrieving a plurality of access conditions.

Further features and advantages of the method and system of the present disclosure may be apparent from the description given below only for exemplificative purpose and without limiting the scope of protection of the present disclosure.

BRIEF DESCRIPTION OF THE DRAWINGS

FIG. 1 is a schematic diagram of a data file of an IC card to be accessed, according to the prior art;

FIG. 2 is a schematic diagram of a logic file of the IC card for controlling an access to the data file of FIG. 1, according to the prior art;

FIG. 4 is a schematic diagram of a data file of an IC card to be accessed, according to the present invention;

FIG. 5 is a schematic diagram of a memory queue including the access conditions to be evaluated for enabling access to the data file of FIG. 4, according to the present invention;

FIG. 6 is a schematic diagram of a stack storing access conditions of the memory queue of FIG. 5; and FIG. 7 is a schematic diagram of a file for controlling the access to the data file of FIG. 4, according to the present invention.

DETAILED DESCRIPTION OF THE PREFERRED EMBODIMENTS

Figure 3A:
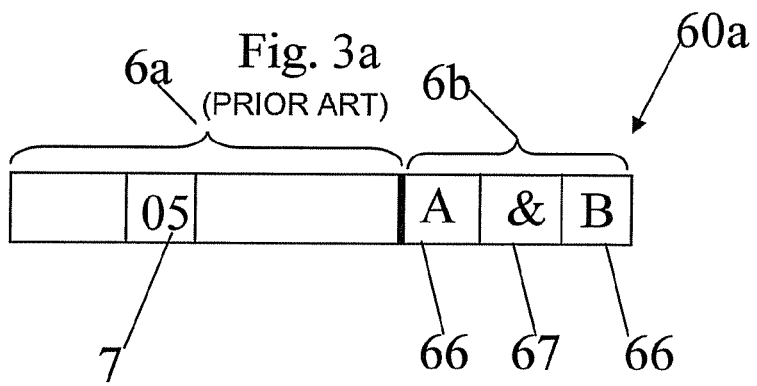
FIGS. 3a-3c are schematic diagrams of three logic files for controlling the access to the data file of FIG. 1, according to the prior art.
Figure 3B:
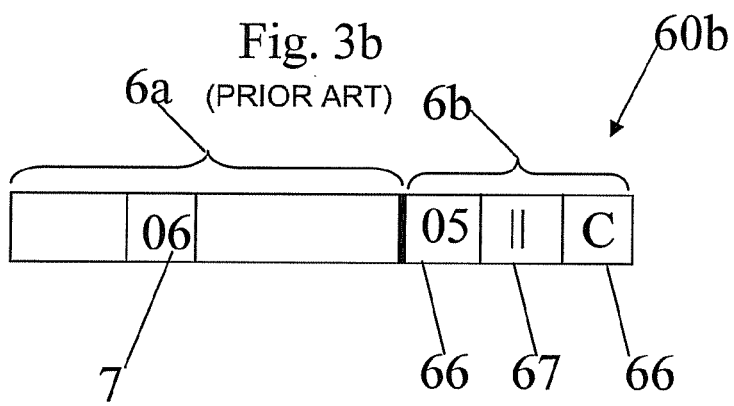
Figure 3C:
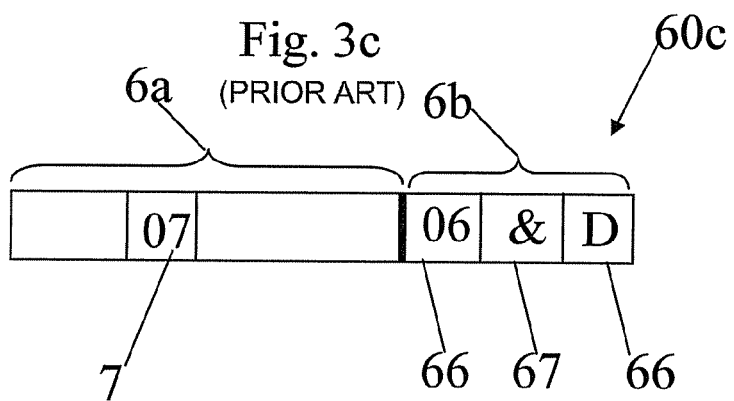

With reference to FIGS. 4-7, the steps of the method for controlling an access to a data file 2 of an IC card according to the present disclosure are schematically represented, the data file 2 including a body portion 2b which stores data and a header portion 2a including a field 9 which stores a file identifier 03 of the data file 2. A plurality of access conditions 3 to be evaluated are associated to the data file 2 in order to deny or allow access to the body portion 2b, for example, to a requesting program of the IC card or to another IC card file. More particularly, the access to the body portion 2b of the data file 2 is enabled if the access conditions 3 thereto associated are satisfied or it is denied, otherwise.

According to the method of the present disclosure, the access conditions 3 to be evaluated are stored in a Reverse Polish Notation format inside a memory queue 4, i.e. in a specified format wherein each access condition A, B, &, ... corresponds to an operand A, B, ... or to an operator &, ... and an operator & always follows the corresponding operands A, B, ..., as schematically represented in FIG. 5. The step of evaluating the access conditions 3 is executed starting from a head 5 of the memory queue 4. More particularly, the access conditions or operands A, B in FIG. 5 are followed by the corresponding access condition or operator &, thus a corresponding operation "A B &" is executed, resulting in a corresponding result X, not represented.

Also, the access conditions C and || in FIG. 5 are stored in compliance with Reverse Polish Notation format, and thus the result X of the first access conditions "A B &" evaluated from the head 5 of the memory queue 4 is used to evaluate the access conditions "X C||". Advantageously, the access condition X, which results from the evaluation of the access conditions "A B &", and the access conditions C||, are stored in the single memory queue 5 and not in a plurality of different logic files.

Figure 3:
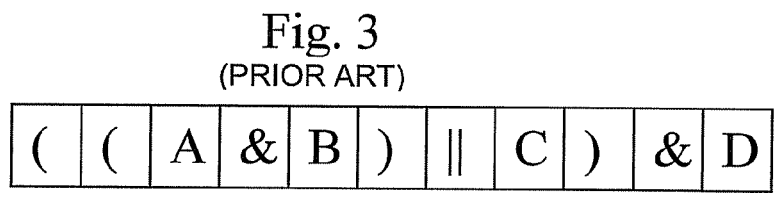
FIG. 3 is a schematic diagram of access conditions to be evaluated for enabling access to the IC card of FIG. 1.

Advantageously, complex access conditions, like the access conditions "((A & B)||C) & D" schematically represented in FIG. 3, are stored in the single memory queue 4 in Reverse Polish Notation Format, i.e. as "A B & C||D &" (FIG. 5). Thus, the method of access to the single memory queue 4 finds all the access conditions to be evaluated to enable or deny access.

According to an aspect of the present disclosure, the step of evaluating comprises reading each access condition 3 from the memory queue 4, starting from the head 5, and processing each access condition as described below. In particular, if the access condition read is an operand A, B, it is pushed on a top of a stack 10, schematically represented in FIG. 6, which is a memory portion 10 of the IC card used to temporarily store the operands used to execute a corresponding operation. Advantageously, the evaluation of the access conditions stored in Reverse Polish Notation through the stack is simple and fast, because the operands are pushed onto the stack in the order in which they are stored in the memory queue 4 and retrieved there from when a first operator is read from the memory queue 4.

More particularly, if the access condition read is an operand &, a pop operation is executed to retrieve one or more access conditions A, B stored onto the stack 10 and to execute an operation thereon, i.e. applying the operator & to the popped operands A, B, and calculating the corresponding result X. When the result X is calculated, it is pushed on the top of the stack 10, in order to be used as an operand for the evaluation of following access conditions C, ||.

Advantageously, the evaluation of the access condition stored in Reverse Polish Notation with a stack is simple and fast also because the first operator & read starting from the head 5 of the memory queue 4 is applied to the operands A, B stored onto the top of the stack 10, thus maintaining the precedence between the operators &, ||, & of the queue memory.

According to another aspect of the present disclosure, the access conditions 3 comprises Boolean operands 0, 1 and Boolean operators &, ||, .... The result of each step of evaluating access conditions "A & B" is always a Boolean value 0, 1, and the access conditions 3 are satisfied, i.e. the access to the body portion 2b is enabled if the result on the top of the stack 10 after the processing of all the queue elements corresponds to a predetermined enabling Boolean value. For example, the Boolean value associated to the enabling of the access to the body portion 2b is the Boolean value 1, and the value associated to the denying of such access is the Boolean value 0.

In a further aspect of the present condition, the access conditions 3 comprises further expressions, which are evaluated before being pushed onto the top of the stack 10. For example, the further expressions are processed from a sub-procedure nested within a program associated to the evaluation of the memory queue, which returns a corresponding Boolean operand 0, 1. The operand 0, 1 returned is then pushed on the top of the stack 10, after the sub-procedure is terminated.

In a preferred embodiment of the present disclosure, the method comprises the step of associating the memory queue 4 to an access control file 6 of the IC card, and the step of storing the access conditions 3 to be evaluated inside a body portion 6b of the access control file 6, as schematically represented in FIG. 7. More particularly, the method provides to store a file identifier 07 of the access control file 6 in a first field 8 of a header portion 2a of the data file 2, and to store the file identifier 07 of the access control file 6 in a first field 7 of a header portion 6a of the access control file 6 itself. Advantageously, the field 8 of the data file 2 allows a simple and fast retrieval of the access control file 6 storing the corresponding access conditions to be evaluated for the data file 2.

According to this preferred embodiment, hereinbelow is described in more detail how the access conditions of a data file 2 are evaluated. An IC card program, which substantially implements the security of the IC card, receives a request to access the data file 2. The request includes a file identifier 03 of the data file 2, which is stored in a second field 9 of the respective header portion 2a.

More particularly, the program reads the file identifier 07 of the corresponding access control file 6 from the first field 8 of the header portion 2a of the data file 2. The program reads the access control file 6, identifying the body portion 6b and executes the step of evaluating the access conditions 3 therein stored to determine if the access to the body portion 2b of the data file 2 may be enabled or denied.

According to another aspect, the present disclosure relates to an IC card implementing the method for controlling the access to a data file described above. More particularly, the IC card stores a data file 2 to be accessed, a plurality of access conditions 3 to be evaluated for accessing the data file 2, and means or a module for enabling the access to the file 2 if the access conditions 3 are satisfied.

According to the IC card of the present disclosure, the access conditions 3 to be evaluated are stored in Reverse Polish Notation format inside a memory queue 4 of the IC card, and the module is programmed to evaluate the access conditions 3 from a head 5 of the memory queue 4. Preferably, the memory queue 4 is associated to an access control file 6 of the IC card, and the access conditions 3 to be evaluated are stored in a body portion 6b of the access control file 6.

More particularly, a first field 8 of a header portion 2a of the data file 2 stores a file identifier 07 of the access control file 6, and a first field 7 of a header portion 6a of the access control file 6 stores the file identifier 07 of the access control file 6. The module of the IC card comprises an input to receive a request to access the data file 2. More particularly, the request includes a file identifier 03 of the data file 2, which is stored in a second field 9 of the header portion 2a of the data file 2, such header portion 2a further comprising the file identifier 07 of the access control file 6 to be evaluated. Advantageously, according to the method and IC card of the present disclosure, the access conditions are evaluated in the order in which they are stored in the memory queue and reading only such memory queue, i.e. avoiding a plurality of accesses to logic files linked together and corresponding reading operations.

Advantageously, the memory space involved in storing the access conditions is reduced, since only one memory queue associated to the data file is used, and the storage of a plurality of header portions 6a of logic files are avoided. Advantageously, the time for evaluating the access conditions is reduced since only the memory queue may be identified and accessed for retrieving a plurality of access conditions and since the Reverse Polish Notation allows for evaluating access conditions in the order in which they are stored in the memory queue.

That which is claimed is:

1. A method for controlling access to a data file of an integrated circuit (IC) card comprising:
   storing a plurality of access conditions to be evaluated for accessing the data file; and
   enabling the access to the file if the access conditions are satisfied by at least
      ordering the plurality of access conditions to be evaluated in a Reverse Polish Notation (RPN) in a memory queue of the IC card, and
      evaluating the plurality of access conditions starting from a head of the memory queue.

2. The method according to claim 1 further comprising:
   associating the memory queue to an access control file of the IC card; and
   storing the plurality of access conditions to be evaluated in a body portion of the access control file.

3. The method according to claim 2 further comprising:
   storing a file identifier of the access control file in a first field of a header portion of the data file; and
   storing the file identifier of the access control file in a first field of a header portion of the access control file.

4. The method according to claim 3 further comprising:
   receiving a request to access the data file, the request including the file identifier of the data file stored in a second field of the respective header portion;
   reading the file identifier of the corresponding access control file from the header portion of the data file; and
   evaluating the plurality of access conditions stored in the body portion of the access control file to enable or deny access.

5. The method according to claim 1 wherein the evaluating comprises:
   reading each access condition from the memory queue;
   if the respective access condition is an operand, pushing the respective access condition on top of a stack; and
   if the respective access condition is an operator, popping at least one access condition from the stack and executing an operation thereon, and pushing a corresponding result on top of the stack.

6. The method according to claim 5 wherein the plurality of access conditions comprise Boolean operands and Boolean operators; and wherein the plurality of access conditions are satisfied and the access is enabled if the result on top of the stack after the processing of the queue corresponds to a predetermined enabling Boolean value.

7. The method according to claim 6 wherein the plurality of access conditions comprise additional expressions evaluated before being pushed on top of the stack, the additional expressions resulting in a Boolean operand.

8. A method for controlling access to a data file of an integrated circuit (IC) card comprising:
   associating a memory queue of the IC card to an access control file of the IC card;
   storing a plurality of access conditions to be evaluated in a body portion of the access control file; and
   enabling the access to the file if the access conditions are satisfied by at least
      ordering the plurality of access conditions to be evaluated in a Reverse Polish Notation (RPN) in the memory queue of the IC card, and
      evaluating the plurality of access conditions starting from a head of the memory queue by at least
         reading each access condition from the memory queue,
         if the respective access condition is an operand, pushing the respective access condition on top of a stack, and
         if the respective access condition is an operator, popping at least one access condition from the stack and executing an operation thereon, and pushing a corresponding result on top of the stack.

9. The method according to claim 1 wherein the ordering of the plurality of access conditions is stored in a single memory queue of the IC card.

10. The method according to claim 8 further comprising:
storing a file identifier of the access control file in a first field of a header portion of the data file; and
storing the file identifier of the access control file in a first field of a header portion of the access control file.

11. The method according to claim 10 further comprising:
receiving a request to access the data file, the request including the file identifier of the data file stored in a second field of the respective header portion;
reading the file identifier of the corresponding access control file from the header portion of the data file; and
evaluating the plurality of access conditions stored in the body portion of the access control file to enable or deny access.

12. The method according to claim 8 wherein the plurality of access conditions comprise Boolean operands and Boolean operators; and wherein the plurality of access conditions are satisfied and the access is enabled if the result on top of the stack after the processing of the queue corresponds to a predetermined enabling Boolean value.

13. The method according to claim 12 wherein the plurality of access conditions comprise additional expressions evaluated before being pushed on top of the stack, the additional expressions resulting in a Boolean operand.

14. The method according to claim 8 wherein the ordering of the plurality of access conditions is stored in a single memory queue of the IC card.

15. An integrated circuit (IC) card comprising:
a memory for storing a data file to be accessed and a plurality of access conditions to be evaluated for accessing the data file; and
a module cooperating with said memory and configured to enable the access to the data file if the plurality of access conditions are satisfied by at least performing
ordering the plurality of access conditions to be evaluated in a Reverse Polish Notation (RPN) in a memory queue of said memory, and
evaluating the plurality of access conditions starting from a head of the memory queue.

16. The IC card according to claim 15 wherein the memory queue is associated to an access control file of the IC card; wherein the access control file comprises a body portion; and wherein the plurality of access conditions to be evaluated are stored in the body portion of the access control file.

17. The IC card according to claim 16 wherein the data file has a header portion with a first field for storing a file identifier of the access control file; and wherein the access control file has a header portion with a first field for storing the file identifier of the access control file.

18. The IC card according to claim 17 wherein said module comprises an input to receive a request to access the data file, the request including a file identifier of the data file; and wherein the file identifier of the data file being is stored in a second field of the header portion of the access control file.

19. The IC card according to claim 15 wherein said memory is configured to:
store a stack including a top whereon said module is configured to push the plurality of access conditions read from the memory queue;
if the respective access condition is an operand, push the respective access condition on top of a stack; and
if the respective access condition is an operator, pop at least one access condition from the stack and executing an operation thereon, and pushing a corresponding result on top of the stack.

20. The IC card according to claim 19 wherein the plurality of access conditions comprises Boolean operands and Boolean operators; and wherein said module is configured to enable the access if the result on the top of the stack after the processing of the memory queue corresponds to a predetermined enabling Boolean value.

21. The IC card according to claim 20 wherein the plurality of access conditions comprises additional expressions to be evaluated; and wherein said module is configured to evaluate the expressions before pushing on the stack a corresponding Boolean operand.

22. The IC card according to claim 15 wherein the ordering of the plurality of access conditions is stored in a single memory queue of the IC card.

* * * * *